(No Model.)
A. SPEAR.
NUT LOCK.
No. 411,265. Patented Sept. 17, 1889.
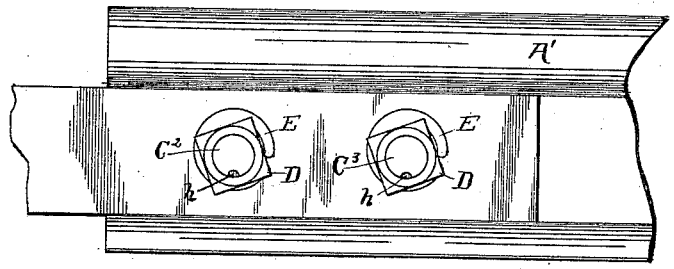
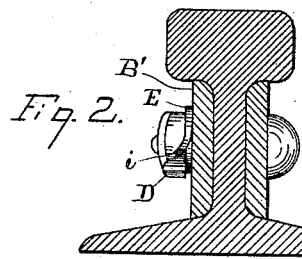
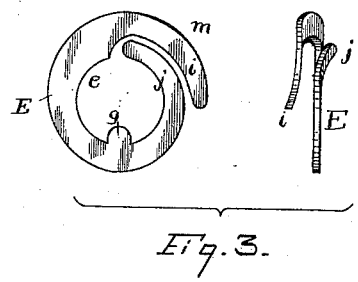
WITNESSES
INVENTOR
Arthur Spear
Per I. N. Kalb
Attorney

UNITED STATES PATENT OFFICE.

ARTHUR SPEAR, OF CHICAGO, ILLINOIS, ASSIGNOR OF ONE-HALF TO THOMAS KELLY, OF SAME PLACE.

NUT-LOCK.

SPECIFICATION forming part of Letters Patent No. 411,265, dated September 17, 1889.

Application filed June 25, 1888. Serial No. 278,100. (No model.)

*To all whom it may concern:*

Be it known that I, ARTHUR SPEAR, a citizen of the United States of America, residing at Chicago, in the county of Cook and State of Illinois, have invented certain new and useful Improvements in Nut-Locks, of which the following is a specification, reference being had therein to the accompanying drawings.

This invention relates to devices for fastening bolt-nuts in place, preventing their becoming loose by the jarring or tremulous motion of the machinery as used for fish-bars of railways, for harvesters, and other places, and it is my object to provide a washer that will form a yielding shoulder for the nut to hold it from rattling and at the same time will form a spring-pawl for holding the nut from turning loose; and with these objects in view my invention consists of the novel devices and combinations of devices hereinafter described and specifically claimed.

In the accompanying drawings, Figure 1 represents a side elevation of the ends of two rails connected by fish-plates secured by bolts provided with my nut-locks. Fig. 2 is a cross-section on line $y\,y$ in Fig. 1, and Fig. 3 a face and edge view of the detached nut-lock washer.

Corresponding letters in the several figures of the drawings designate like parts.

A and A' denote the two railway-rails, and B B' the fish-bars for coupling the same, and C, C', $C^2$, and $C^3$ the bolts passed through the fish-bars and rail-webs, and D the nuts for these bolts. The bolts C are generally squared under their heads to fit into square holes punched through fish-bar B for holding these bolts from turning.

E is a washer-plate having an eye $e$ to pass it over the bolt end and being provided with a nose $g$, projecting into its eye to engage with a groove $h$, formed longitudinally in the screw-threaded portion of bolt $C^2$ or $C^3$ to hold the washer from turning. From the eye to its exterior this washer is split on a spiral line, so as to form two tongues $i$ and $j$, the one $i$ overlapping the other $j$, and these tongues are bent laterally to assume the shape of a helix. A washer thus shaped being placed with its inward tongue $j$ against the fish-bar, the exterior tongue $i$, projecting, will provide a spring-pawl the end of which will engage either side of the nut, preventing its turning loose, while at the same time the middle portion $m$ of said tongue being compressed by one corner of nut D bearing upon this tongue by its elastic tension will prevent such nut from rattling. For loosening or removing nut D the tongue $i$ must be depressed and held down to clear the same.

What I claim is—

The combination, with bolt C, longitudinally grooved at its screw-threaded end, of washer-plate E, provided with nose $g$ to engage the groove of the bolt, and being spirally slit from its outer edge to the bolt-hole or eye $e$ to provide two helical tongues $j$ and $i$, bent in opposite directions, the one $j$ to provide an elastic shoulder between the fish-plate and the under side of nut D, and the other one $i$ to form a spring-pawl engaging either corner of nut D, all substantially as set forth.

In testimony whereof I affix my signature in presence of two witnesses.

ARTHUR SPEAR.

Witnesses:
 WILLIAM H. LOTZ,
 OTTO LUBKERT.